Dec. 6, 1966  H. G. MULLER  3,289,283
FEEDING MECHANISM
Filed Oct. 23, 1964  3 Sheets-Sheet 2

Inventor:
Horst G. Muller
by Otto Tichy
His Attorney

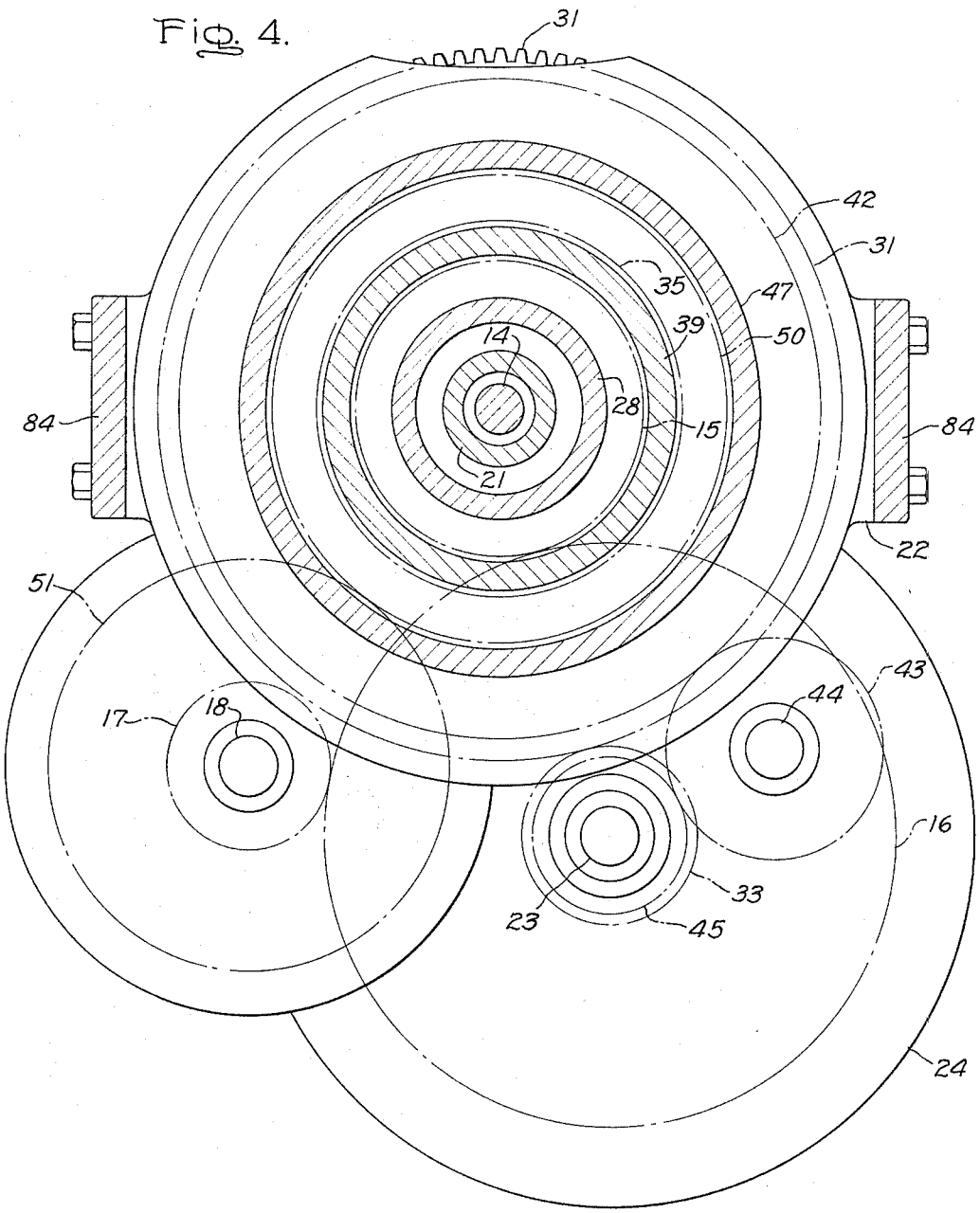

3,289,283
FEEDING MECHANISM
Horst G. Muller, Cleveland, Ohio, assignor to General Electric Company, a corporation of New York
Filed Oct. 23, 1964, Ser. No. 405,987
6 Claims. (Cl. 29—203)

The present invention relates to feeding mechanisms and particularly to such mechanisms useful in conjunction with machines for making the bases of miniature incandescent lamps, such bases commonly consisting of metallic shell and bottom contact pieces held together by a web of insulating material such as thermosetting organic plastic electrically insulating molding material.

In the manufacture of such bases the web of the base may be formed from a preform of the organic plastic molding material by a base-making machine which shapes the preform into the desired configuration of the web uniting the metal shell and the bottom contact pieces. A machine of this type is disclosed and claimed in copending application Serial No. 405,907, filed October 23, 1964, in which the present applicant along with Elton G. Moneymaker are named as joint inventors.

The principal object of the present invention is to provide an automatic feeding mechanism for positioning the organic plastic preform on the dies of a base-making machine of the type disclosed and claimed in the copending application and the invention is herein illustrated in connection with dies of the base-making machine of the aforesaid copending application for which machine it has particular utility. It will be understood, however, that the feeding mechanism of the present invention is useful for feeding articles other than organic plastic preforms and for other machines.

In the drawings accompanying and forming part of this specification:

FIG. 3 is a perspective view of a preform positioned above a die of a base-forming machine;

FIG. 4 is a sectional view taken along the line 4—4 of FIG. 2 in the direction of the arrows showing the lower portion of the feeding mechanism in plan and with the actuating and timing gears illustrated schematically; and FIG. 5 is a perspective fragmentary view of the transfer element of the feeding mechanism showing preforms in place on the dies of the base-forming machine.

Figure 1:
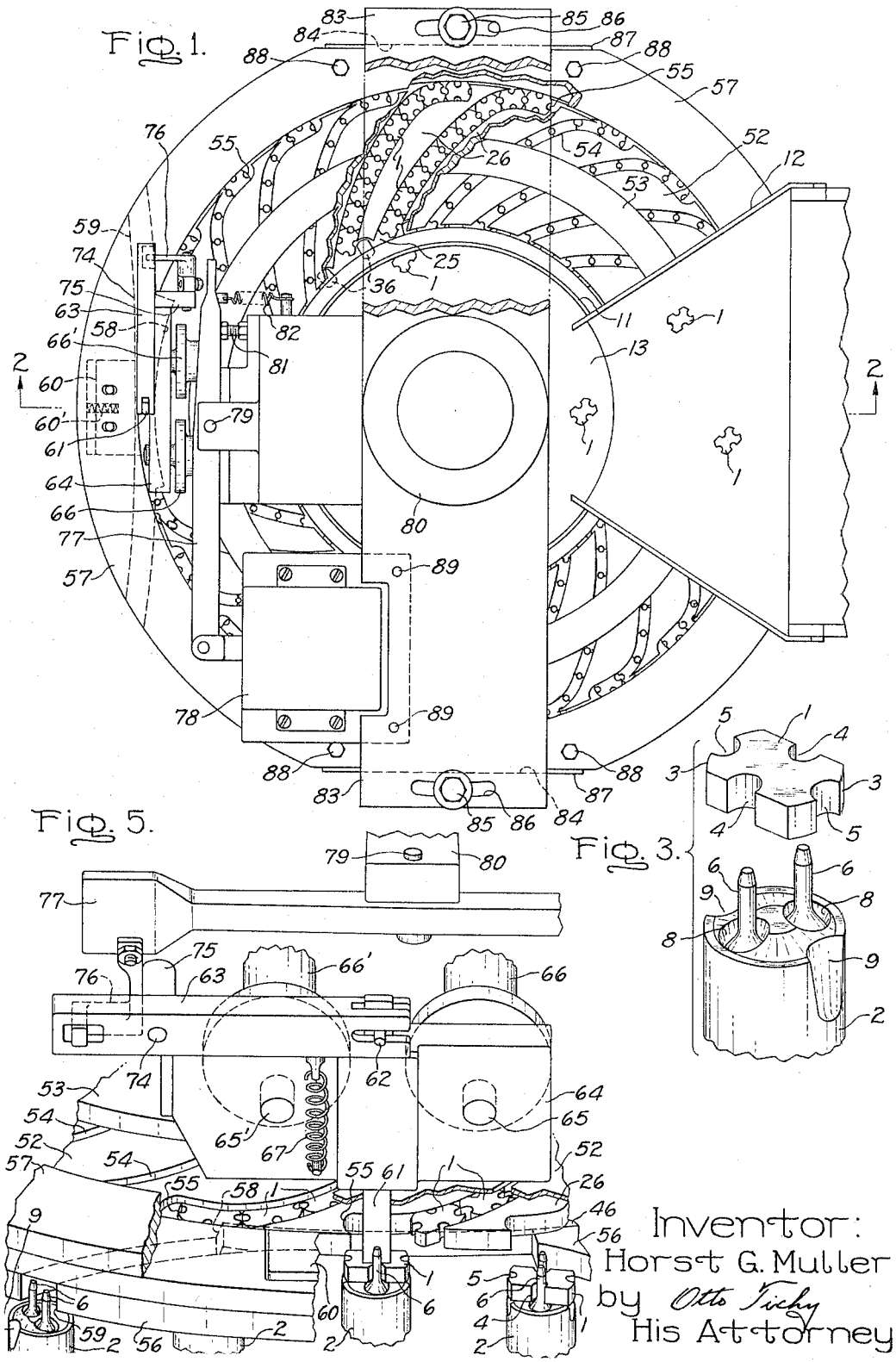
FIG. 1 is a plan view of the feeding mechanism embodying the invention for feeding preforms of organic plastic molding material of the shape shown in this figure and in FIGS. 3 and 5 of the drawings.

The machine of the copending application referred to above molds the preforms 1 into a web and includes a series of post-like dies 2 of the type shown in FIGS. 3 and 5 carried in equally spaced apart positions on a rotary turret which is driven continuously about a vertical axis and presents the post-like dies in succession to the preform feeder mechanism. The feeder mechanism of the present invention is adapted to accurately place a preform 1 of organic plastic molding material upon each succeeding die 2. The preforms which consist of compressed powdered organic plastic molding material, are of uniform size, generally rectangular in shape, are of slightly greater length than width and have rounded ends 3 and notches 4 in the sides as well as notches 5 in the ends, all as shown in FIGS. 1, 3 and 5 of the drawings.

The post-like dies 2 have a pair of upstanding pins 6, are provided with molding cavities 8 and 9 and shape the inner surface of the organic plastic web into which the preform 1 is molded by the base-forming machine of the copending application. As shown in FIG. 5 the feeding mechanism of the present invention places a preform 1 between the pins 6 which engage the notches 4 in the sides of the preform 1 to hold the preform in proper molding position on the die.

Referring now to the automatic feeding mechanism for feeding and inserting the preforms in appropriate relation to the dies as described above, the preforms are contained in a supply hopper or receptacle 11 from which they are discharged to receiving and transporting means continuously rotatable about a vertical axis and presented in a continuous series to a transfer mechanism of the feeder as described below.

Figure 2:
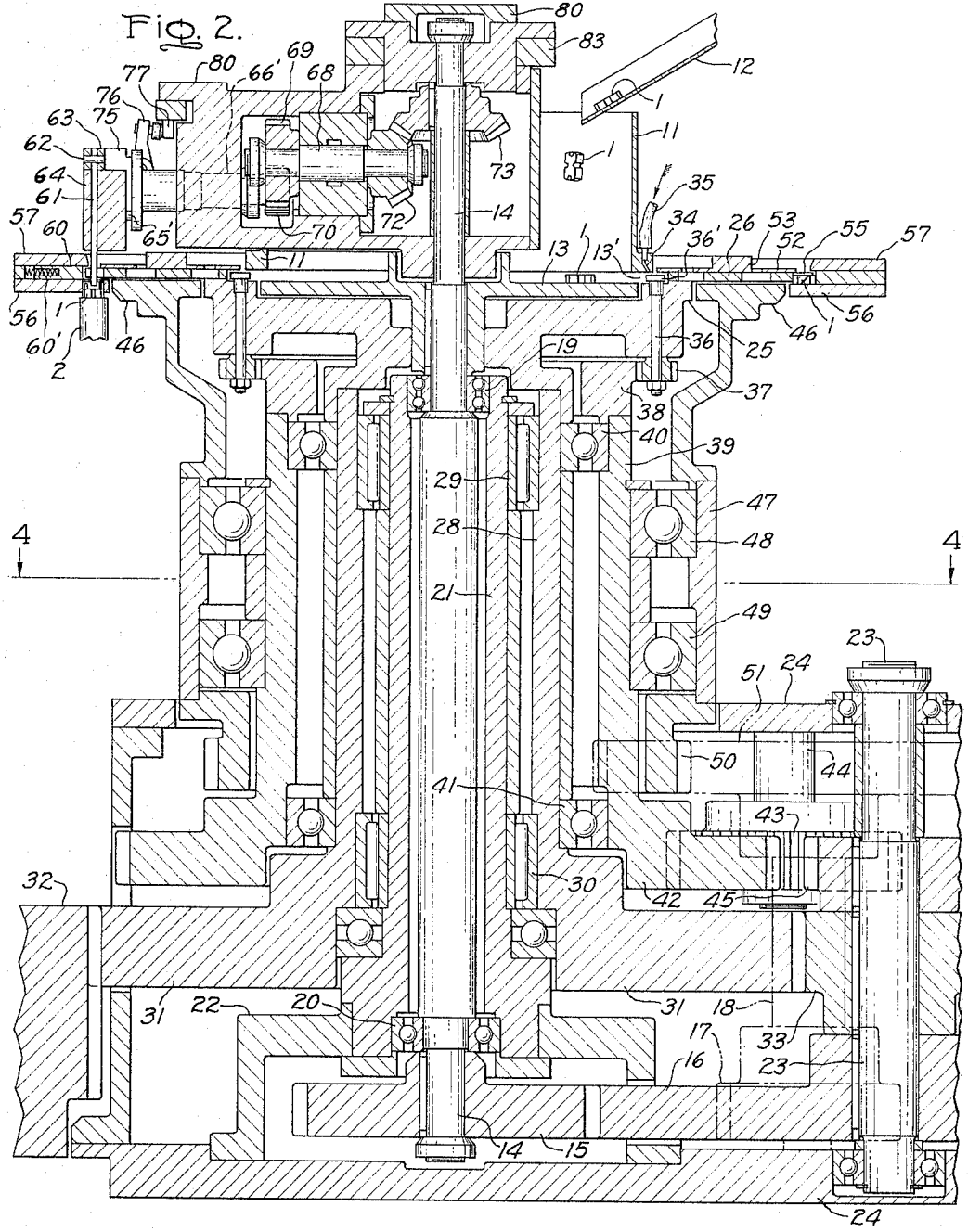
FIG. 2 is a vertical section taken along the line 2—2 of FIG. 1 in the direction of the arrows.

As shown in FIGS. 1 and 2 of the drawings, a supply of the preforms is contained in the hopper 11 of the feeding mechanism, which supply is replenished as needed by passing additional preforms down the chute 12. The bottom of the hopper is constituted by the disc 13 which is rotated in a counter-clockwise direction. The rotation of the disc 13 causes the preforms thereon to slide outwardly through the slot 13' between the disc 13 and the cylindrical side wall of the hopper 11. The disc 13 is affixed to the shaft 14 which is rotated in a counter-clockwise direction by the train of gears 15, 16 and 17 connecting the shaft 14 with the shaft 18 of the feeder mechanism as shown in FIGS. 2 and 4. The gear 15 is affixed to shaft 14, the gear 17 is affixed to shaft 18 and the gear 16 is affixed to intermediate drive shaft 23. Ball bearings at 19 and 20 affixed to the upper and lower ends respectively of the fixed hollow support post 21 mounted on the housing or frame 22 support the shaft 14. The gear 16 is affixed to the intermediate drive shaft 23 mounted in bearings on the laterally extending portion 24 of the housing 22 and connected to the main drive shaft as described below.

In order for the preforms to pass through the slot 13' they must lie flat upon the plate 13 and as they pass through the slot in this position they slide onto the annular flat plate 25 surrounding the disc 13 and mounted for rotation continuously in the same counter-clockwise direction as the disc 13. The plate 25 is rotated at an angular speed substantially less than that of the disc 13 so that the preforms rotate as they slide from the disc 13 onto the plate 25.

The rotating motion of the preforms facilitates the entrance thereof into the inner end of curving guideways or channels of the transporting means the sides of which are defined by the curved dividers 26 affixed to and extending outwardly from rotatable annular plate 25. The dividers are spaced apart a distance less than the length but sufficiently greater than the width of the preforms so as to receive therebetween and guide therealong in oriented position the preforms as described below. The entrance end of the guideways faces the center of rotation of the plate 25.

The annular plate 25 together with the dividers 26 is driven also in a counter-clockwise direction so that the entrance end of the guideways is in advance of the exit or outer end thereof as the plate 25 is rotated by sleeve 28 to which it is affixed. Sleeve 28 is journalled on shaft 21 by bearings 29 and 30 (FIG. 2) and is driven by gear 31 affixed to sleeve 28 and gear 32 which meshes with gear 31. Gear 32 is a drive gear of the base-forming machine and may be utilized to properly time the operation of the feeding mechanism with that of the base-molding machine. Gear 31 is the main drive gear of the feeding mechanism which itself is driven in a counter-clockwise direction by gear 32.

The drive for disc 13 includes gear 31 affixed to sleeve 28, gear 33 affixed to shaft 23 and meshing with gear 31 and gear 16 which is affixed to shaft 23 and is included in the drive of disc 13 as described above.

To facilitate the entrance of the preforms into the guideways and to propel the preforms across plate 25, a series of air jets 34, one of which is shown in FIG. 2, is provided in the bottom rim of the stationary cylindrical side wall of hopper 11 to direct streams of air across plate 25 toward the entrances of the guideways. The air jets are supplied through conduits 35 connected to a source (not shown) of air under pressure.

Also, a series of spindles 36 having elongated heads 36' is provided for preventing blocking of the entrances of the guideways by the preforms by turning the preforms so that they may enter the guideways under the impetus of their momentum and the force of the air jets with their larger dimension extending along the guideways. The spindles are mounted for rotation on and extend through the plate 25 and are rotated by gears 37 affixed to their lower ends engaging ring gear 38 affixed to sleeve 39. Sleeve 39 is journalled on sleeve 28 by ball bearings 40 and 41 and is driven by gear 42 affixed to the sleeve 39 which meshes with gear 43 affixed to shaft 44 and gear 45 affixed to shaft 23 which is connected with the main drive gear 31 of the feeder through gear 33 as described above and shown in FIG. 4.

The preforms, after traversing the annular plate 25, are moved outwardly along the arcuate guideways by their frictional engagement with the annular plate 46 supporting the preforms in the guideways and which is rotated in a clockwise direction counter to the direction of rotation of the dividers 26 affixed to plate 25. The plate 46 is rotated in a clockwise direction by sleeve 47, journalled on sleeve 39 by bearings 48 and 49, which is driven from shaft 18 through gears 50 and 51 (FIG. 4). Shaft 18 is connected to main drive gear 31 through gear 17, gear 16, shaft 23, and gear 33.

In order to keep the preforms down in the guideways against the forces tending to lift them, an annular cover 52 is provided as shown in FIGS. 1 and 2. The cover which is stiffened by a rib portion 53 midway of its width, is attached to and supported by the dividers 26 so as to rotate therewith. Slots 54 in the cover 52 are directly over and extend along the guideways formed by the dividers 26 so as to give access to the preforms travelling therealong. The slots 54 are, however, of lesser width than the guideways so as to prevent the preforms being forced out of the guideways.

The preforms, as they reach the outer ends of the guideways, enter the elongated sockets 55 defined by the curved outer ends of the dividers 26, the preform supporting lip 56 (FIG. 2) on the annular stationary frame 57 mounted around the plate 46 and the inner periphery of the frame 57. The sockets 55 support the preforms with the longitudinal axes thereof normal to a radius of the annular plate. Thus, the preforms which enter the guideways with their longitudinal axes extending radially of the center of rotation of plate 25 are turned 90° as they are moved along the guideways and into the sockets 55.

As the annular plate 25 together with the dividers 26 is rotated in a counter-clockwise direction as described above the preforms in the sockets 55 are carried in succession into registry with the dies 2 of the base-molding machine for being placed on the dies by the transfer mechanism shown in FIG. 5.

In the region of the transfer mechanism the lip 56 of the stationary frame 57 defines an opening 58 above the path of travel of the dies through which opening the preforms are pushed downwardly, as described below, onto the dies 2 as the latter are carried in a clockwise direction in the circular path indicated by dash lines in FIGS. 1 and 5. The supporting lip 56 defines an arcuate channel 59 for the passage of the dies 2 into the opening 58.

As the preforms are carried over the opening 58 they are retained on the curved outer ends of the dividers 26 and prevented from falling through the opening by the spring-pressed friction shoe 60 mounted on the frame 57 and extending along the opening 58 in position to engage the preforms and press them against the sides of the socket defining ends of dividers 26 with sufficient force to hold the preforms in position against the force of gravity, all as shown in FIGS. 2 and 5. The spring for shoe 60 is shown at 60' in FIGS. 1 and 2.

The preforms are forced downwardly through the opening 58 and between the upstanding pins 6 on the dies 2 by the transfer mechanism shown in FIG. 5 which includes a vertical plunger 61 the lower end of which engages the preforms as it is continuously rotated in a counter-clockwise direction about a horizontal axis. The continuous movements of the plunger 61, the preforms 1 and the dies 2 are in timed relation such that as the pins 6 on the dies are brought into alignment with a radius of the feeder the plunger 61 is at the bottom of its circular path of movement and the longitudinal axis of a preform is normal to that radius including the die pins 6. At that moment the longitudinal axis of the die 2 coincides with the center of the circular path of motion of the preform engaging end of the plunger and passes through the longitudinal axis of the preforms so that the preform is in registry with the die and is accurately placed on the die with the pins 6 in the notches 4. In other words, the circular paths of movement of the preforms and the dies touch a vertical line passing through the center of the circular path of movement of the preform engaging end of the plunger.

The plunger 61 of the transfer mechanism is supported in the normal operation of the feeder by the pin 62 affixed to its upper end. The pin engages the sides of a slot in a lever 63 which is supported by the block 64 as shown in FIG. 5. The block 64 in turn is supported by the pins 65 and 65' passing through the block and affixed in eccentric positions on the spindles 66 and 66'. The spring 67 fastened to the lever 63 and the block as shown in FIG. 5 holds the lever down on the block during normal operation and permits the plunger supporting end of the lever to be lifted as described below to interrupt feeding of the preforms, when desired.

The spindles 66 and 66' are rotated by shaft 68 (FIG. 2), gear 69, gears 70 (one only of which is shown) bevel gears 72 and 73, shaft 14 to which plate 13 is affixed, and thence in common with the drive of plate 13, gear 15, gear 16, shafts 23, gear 33, gear 31 affixed to shaft 28 and gear 32.

The drive for the plunger 61 is so correlated with the drive for the plate 25 carrying the dividers 26 that the preforms 1 are forced through the opening 58 at proper time intervals for delivery to the dies 2 of the base-molding machine.

The circular motion imparted to the plunger 61 as described above makes possible the engagement of the lower end of the plunger with the center of the preform as shown in FIGS. 2 and 5, as the preform is carried along its circular path. The circular motion of the plunger results in a gradual push rather than a sharp punch being delivered to the preform to force it through the opening 58 and onto a die. The spacing between the bottom of the preform and the top of the die pins 6 at the location of the opening 58 is small so that a slight downward movement of the preform suffices to bring the sides of notches 4 of the preform into engagement with the tapered upper ends of the pins 6 and the pins serve to guide the preform into its at rest position on the die 2 as the preform is moved downward by the plunger. The plunger 61 is of substantial width and engages the center of the preforms along a line of substantial length to avoid tilting the preform.

For various purposes it may be desired, occasionally, to interrupt the feeding of the preforms without stopping the operation of the entire feeding mechanism. In accordance with the present invention this is accomplished in a simple manner solely by raising the plunger to prevent its engagement with the preforms. The preforms are then carried beyond the opening 58 and retained in the feeding mechanism until the plunger is lowered to its operating position.

The plunger is lifted and held in a lifted position by tilting the lever 63 with respect to the block 64 to raise the plunger supporting end of the lever up from the block. The block 64 provides slideways for the plunger. The lever is hingedly connected to the block by the pin 74 on the bracket 75 fastened to the block 64. The lever 63 is turned around the pin 74 by the bell crank lever 76 which is supported by a pin on bracket 75 and engages the no load end of the lever 63 as shown in FIG. 5.

When the plunger 61 is to be lifted the lever 76 is turned on its supporting pin in the direction effective for this purpose by the lever 77 the movement of which is controlled by the solenoid 78 (FIG. 1). The lever 77 is supported by pin 79 affixed to gear housing 80, which also supports the spindles 66 and 66', and in its disengaged position with respect to lever 76 is held against the adjustable stop 81 by the spring 82. When the solenoid 78 is energized the three levers 63, 76 and 77 are turned on their respective pivot pins to raise the plunger 61 to a position whereat it does not engage the preforms. The feeding of the preforms is resumed when the solenoid is de-energized which allows the spring 82 to pull lever 77 into its disengaged position with respect to lever 76 and allows spring 67 to pull down and hold the plunger supporting end of the lever 63 against the block 64. The lower end of the plunger 61 is then in position to engage the preforms as described above.

The gear housing 80 supporting the preform transfer mechanism is supported by the cross bar 83 which is adjustably mounted on the posts 84 secured to and upstanding on frame 22. Angular adjustments of the placer mechanism with respect to the point at which the paths of the preforms and the dies coincide or touch each other to effect changes in the time at which the lower end of the plunger 61 engages and forces the preforms downwardly onto the dies as described above may be made by loosening the bolts 85 on the posts 84 and extending through the slots 86 in the cross bar 84 sufficiently to allow the adjustment to be made. The stationary frame 57 is attached to the flanges 87 on the posts 84 by the bolts 88. The solenoid 78 is bolted to the cross bar 83 as shown at 89 and the wall 11 of the hopper is fastened to the cross bar 84 by straps (not shown).

What I claim as new and desire to secure by Letters Patent of the United States is:

1. A machine for assembling and seating preforms onto die members having a turret continuously rotatable about a vertical axis and having a preform receiving member upstanding on its periphery, and preform feeding, positioning and assembling mechanisms comprising
   (a) preform receiving and transporting means continuously rotatable about a vertical axis for carrying the preform into registry with the continuously moving preform receiving member,
   (b) preform supporting means beneath a portion of said preform transporting means for supporting the preform until the preform is carried by said preform transporting means proximate to the path of travel of said member,
   (c) said transporting means having a peripheral portion defining with said supporting means a preform receiving socket,
   (d) preform retaining means adjacent to the said path and resiliently biased against the preform for retaining the preform on the said transporting means as said preform is carried into registry with the said member,
   (e) transfer means mounted adjacent said retaining means for exerting on said retained preform a force sufficient to overcome the retaining action of said preform retaining means and to seat said preform on the said member,
   (f) said transfer means comprising a plunger having a preform engaging end continuously rotatable about a horizontal axis, and
   (g) actuating and timing means interconnecting said transporting means and said transfer means to control the feeding of said preform.

2. A combination according to claim 1 wherein the preform receiving socket extends normal to a radius of the said peripheral portion.

3. A combination according to claim 2 wherein the preform transporting means includes a curved guideway having an exit end leading into the said socket, extending from said socket inwardly toward the axis of rotation of the said peripheral portion and having the entrance end thereof extending substantially radially of the said circular peripheral portion, wherein an annular rotatable preform supporting means is provided beneath a portion of said guideway and wherein interconnecting means is provided for rotating the guideway with the preform entrance end thereof in advance of the exit end thereof in the direction of rotation of the guideway and for rotating the annular preform supporting means in the opposite direction to carry the preform along the curved guideway toward the said socket whereby the preform is turned 90° as it is moved from the entrance end of the guideway into the socket.

4. A combination according to claim 3 wherein a preform receptacle defining a discharge slot and having a rotatable bottom for moving contained preforms outwardly through the slot is provided proximate the entrance end of the guideway.

5. A combination according to claim 4 wherein preform orienting and propelling means is provided between the said discharge slot and the entrance end of the guideway.

6. A combination according to claim 1 wherein the transfer means includes means for supporting the plunger in a raised position for interrupting the feeding of the preforms.

References Cited by the Examiner
UNITED STATES PATENTS

| | | | |
|---|---|---|---|
| 2,683,924 | 7/1954 | Schryver | 29—203 |
| 3,037,269 | 6/1962 | Barkstrom et al. | 29—203 |
| 3,065,530 | 11/1962 | Merchant et al. | 29—208 X |
| 3,121,281 | 2/1964 | Petro | 29—203 |

JOHN F. CAMPBELL, *Primary Examiner.*

THOMAS H. EAGER, *Examiner.*